United States Patent
Overmyer et al.

(10) Patent No.: US 6,659,750 B1
(45) Date of Patent: Dec. 9, 2003

(54) BLOW MOLD WITH REMOVABLE INSERTS

(75) Inventors: Shawn L. Overmyer, Fremont, OH (US); Martin Cass, Port Clinton, OH (US)

(73) Assignee: Omnimold, LLC, Chagrin Falls, OH (US)

( * ) Notice: Subject to any disclaimer, the term of this patent is extended or adjusted under 35 U.S.C. 154(b) by 160 days.

(21) Appl. No.: 09/704,107

(22) Filed: Nov. 1, 2000

(51) Int. Cl.$^7$ ................................................ B29C 49/54
(52) U.S. Cl. .......................... 425/3; 249/102; 425/503; 425/510; 425/522; 425/531; 425/DIG. 33; 425/DIG. 58
(58) Field of Search ................................ 425/522, 531, 425/532, 806, 3, DIG. 33, DIG. 58, 503, 510; 249/102

(56) References Cited

U.S. PATENT DOCUMENTS

| | | | |
|---|---|---|---|
| 4,032,278 A | 6/1977 | Kuenzig et al. | 425/525 |
| 4,073,609 A * | 2/1978 | Petrenchik | 425/442 |
| 4,692,108 A | 9/1987 | Cesano | 425/292 |
| 4,909,721 A | 3/1990 | Warburton | 425/289 |
| 5,040,962 A | 8/1991 | Waszeciak et al. | 425/112 |
| 5,085,571 A | 2/1992 | Congleton | 425/292 |
| 5,114,651 A | 5/1992 | Warburton | 264/156 |
| 5,182,065 A | 1/1993 | Piotrowski et al. | 264/153 |
| 5,183,673 A * | 2/1993 | Schurman | 425/522 |
| 5,188,787 A | 2/1993 | King et al. | 264/153 |
| 5,480,607 A | 1/1996 | Hobson | 264/536 |
| 5,560,939 A | 10/1996 | Nakagawa et al. | 425/139 |
| 5,698,236 A | 12/1997 | Hobson | 425/531 |
| 5,736,168 A | 4/1998 | Goyal et al. | 425/522 |
| 5,800,759 A | 9/1998 | Yamazaki et al. | 264/163 |
| 5,804,127 A * | 9/1998 | Takatori et al. | 264/515 |
| 5,910,283 A | 6/1999 | Hobson | 264/536 |

FOREIGN PATENT DOCUMENTS

| | | | | |
|---|---|---|---|---|
| JP | 02008027 A | * | 1/1990 | B29C/49/50 |
| JP | 03290227 A | * | 12/1991 | B29C/49/20 |
| JP | 07205268 A | * | 8/1995 | B29C/49/54 |
| JP | 08267552 A | * | 10/1996 | B29C/49/20 |
| JP | 10138323 A | * | 5/1998 | B29C/49/20 |

OTHER PUBLICATIONS

Edwin G. Fisher, Blow Moulding of Plastics, 1971, Page Brothers, pp. 103–104.*
Web Page for Hobson Mould Works (www.hobson.com) dated Dec. 9, 1999.

* cited by examiner

*Primary Examiner*—Robert Davis
(74) *Attorney, Agent, or Firm*—Calfee, Halter & Griswold LLP

(57) ABSTRACT

A mold is provided for forming molded parts having flash seams which are moved to inconspicuous locations. The mold, which is typically used to make blow molded parts, includes two or more mold blocks and removable inserts which allow relocation of flash seams and at the same time allow removal of the finished part from the mold.

10 Claims, 7 Drawing Sheets

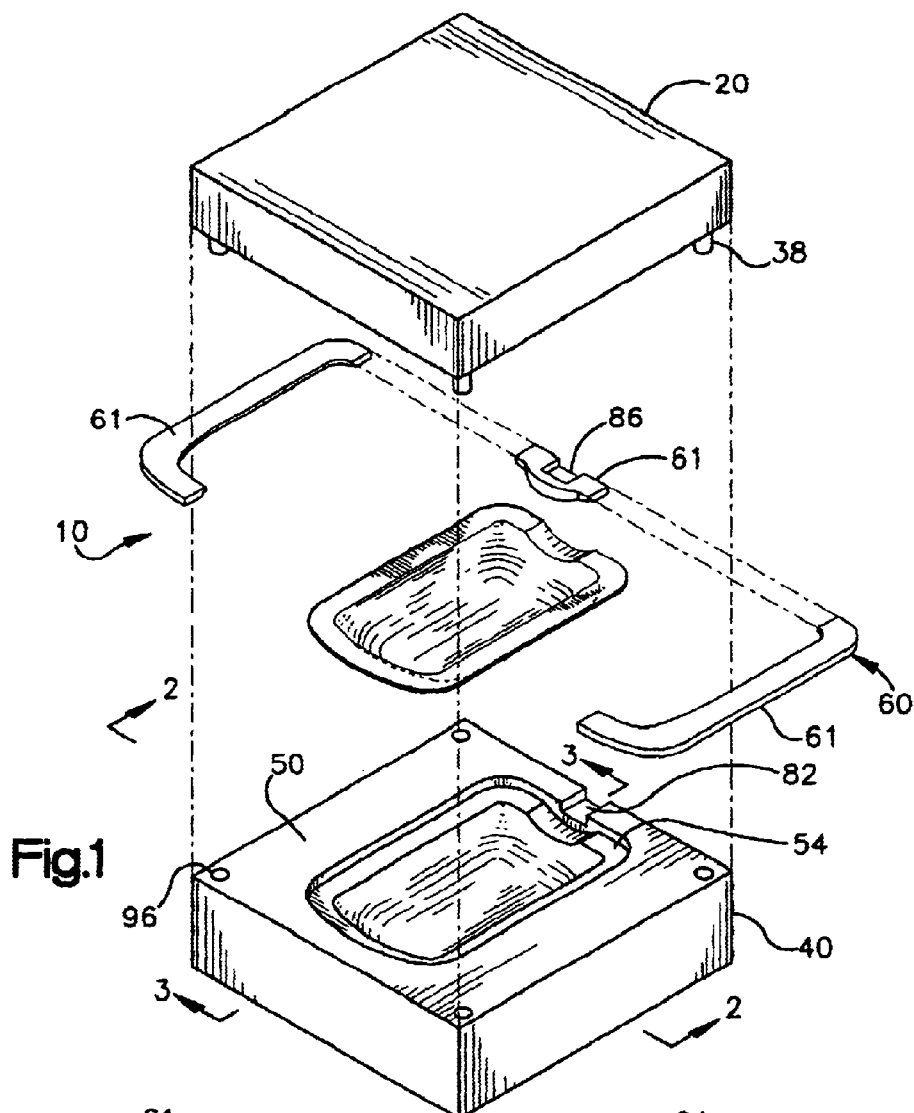
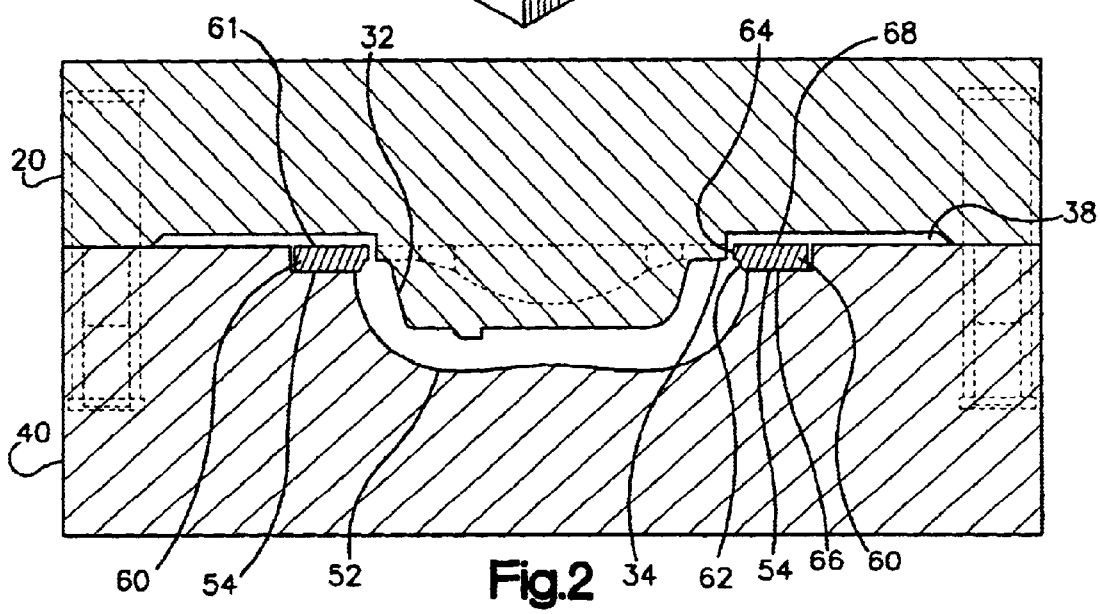

BLOW MOLD WITH REMOVABLE INSERTS

FIELD OF THE INVENTION

This invention relates to molds, more particularly to molds used in blow molding which allow a flashing seam to be moved to an inconspicuous location.

BACKGROUND OF THE INVENTION

Molding is a process used to form substances into desired shapes. Typically a metal or plastic substance, in a fluid state, is placed into a mold by gravity or mechanical force. Most molds consist of two or more blocks, which are separated after the substance has solidified. The finished part is removed from the mold and the molding process is repeated.

Plastics may be molded using a variety of processes including blow molding, injection molding, compression molding, transfer molding, and rotational molding. Blow molding is basically a bulging process. A tubular piece of plastic is heated and then pressurized internally and expanded into the cavity of a relatively cool mold. Typical blow molded products are hollow, thin-walled containers or articles.

One drawback of any molding process is the by-product of flash, a thin layer of material, which is formed within the gap between the mold blocks. Flash is removed from finished parts, often in a subsequent manufacturing operation, but typically a seam remains on the part in the area where the flash originated. Flash seams may not be desirable in ornamental molded products.

Relocation of flash seams can be difficult depending upon the shape of the molded part and correspondingly, the shape of the interior surface of the mold blocks. A part having convex surfaces will have predictable flash seam locations if one of the convex surfaces is aligned with the interior mold surface where the mold blocks meet. The seam must be at the apex of this convex surface in order to allow the finished part to be ejected from the mold.

Removing undesired flash during the molding operation with the use of flash retainer in the mold is the subject of U.S. Pat. No. 5,480,607. This method has the drawback of still leaving a seam in a conspicuous location. Inserts have also been used previously in mold cavities. Inserts have been used to apply designs, such as dates arid codes to the surface of the molded product (U.S. Pat. No. 5,736,168) and used to achieve small variations in the shape of the molded product without the requirement of manufacturing an entirely new mold (U.S. Pat. No. 5,560,939). Inserts have also been used to sheer and seal ends of a parison in a blow mold (U.S. Pat. No. 4,032,278). These inventions do not allow or teach moving the flash seam on a molded product for ornamental reasons.

A mold, having inserts, which can relocate the flash seam to an inconspicuous location is desired.

SUMMARY OF THE PRESENT INVENTION

The present invention overcomes disadvantages in the prior art by providing an improved mold. The invention provides in one aspect a mold which allows flash seams to be placed in an inconspicuous location comprising two or more mold blocks where a first block has a contact surface, which partially defines the shape of a molded part, a seating surface and a mating surface. A second block half has a contact surface, a sheer surface and a mating surface which abuts the mating surface of the first mold block when the mold is closed. The mold also has removable inserts having contact surfaces, which in conjunction with the mold block contact surfaces define a mold cavity, and having sheer edges which are apposed to the sheer surface of the second mold block. The inserts are seated upon the seating surface of the first mold block and restrict removal of a molded part by overhanging the mold cavity.

The invention provides in another aspect a method for displacing a flash seam away from a point of greatest width of a molded part, comprising extending a parison between a first mold block having a seating surface upon which an insert assembly is placed and a second mold block. The first mold block and second. mold block are brought together. In a subsequent step the parison is inflated with air to form a part. The point of greatest width of the part is located where the insert assembly rests upon the seating surface of the first mold block, yet a flash seam is formed between the insert assembly and the second mold block.

These and other aspects of the invention are herein described in particularized detail with reference to the accompanying Figures.

BRIEF DESCRIPTION OF THE FIGURES

FIG. 1 is a perspective view of the pin block, bushing block, and insert assembly of the mold as well as a molded part;

FIG. 2 is a cutaway view of the mold containing a finished part;

DETAILED DESCRIPTION OF PREFERRED AND ALTERNATE EMBODIMENTS

Figure 6:
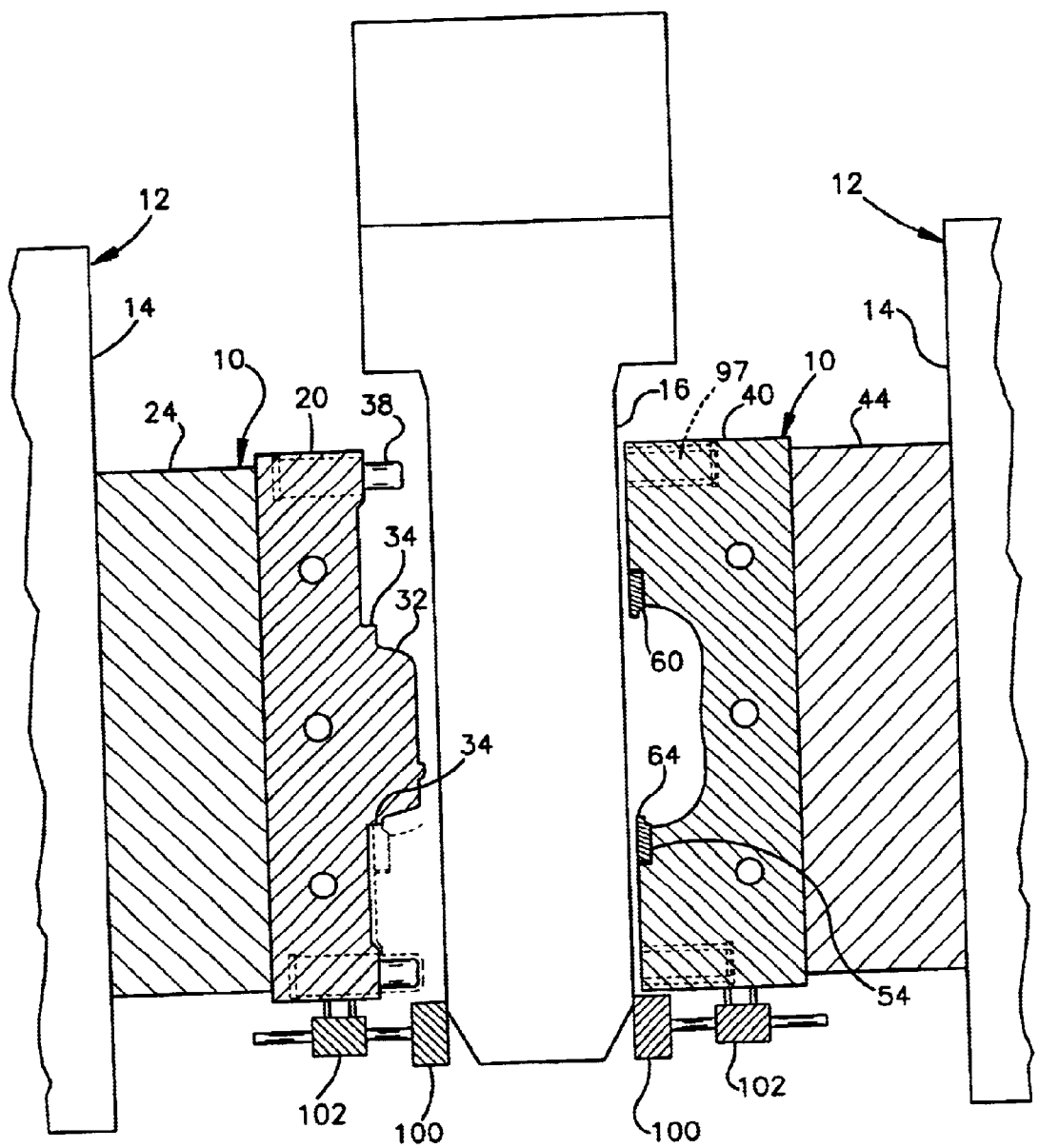
FIG. 6 is a schematic of the mold installed within a molding machine.

Referring to the drawings, FIG. 1 illustrates a preferred mold 10 according to the invention. The mold 10 is used in combination with a molding machine 12, as shown in FIG. 6, to manufacture molded parts. This mold 10 may be used to create molded parts having flash seams which are inconspicuously located. The mold 10, as described in more detail below, comprises a pin block 20, a bushing block 40, and a removable insert assembly 60. Methods of molding parts using the mold 10 will also be described.

Figure 4:
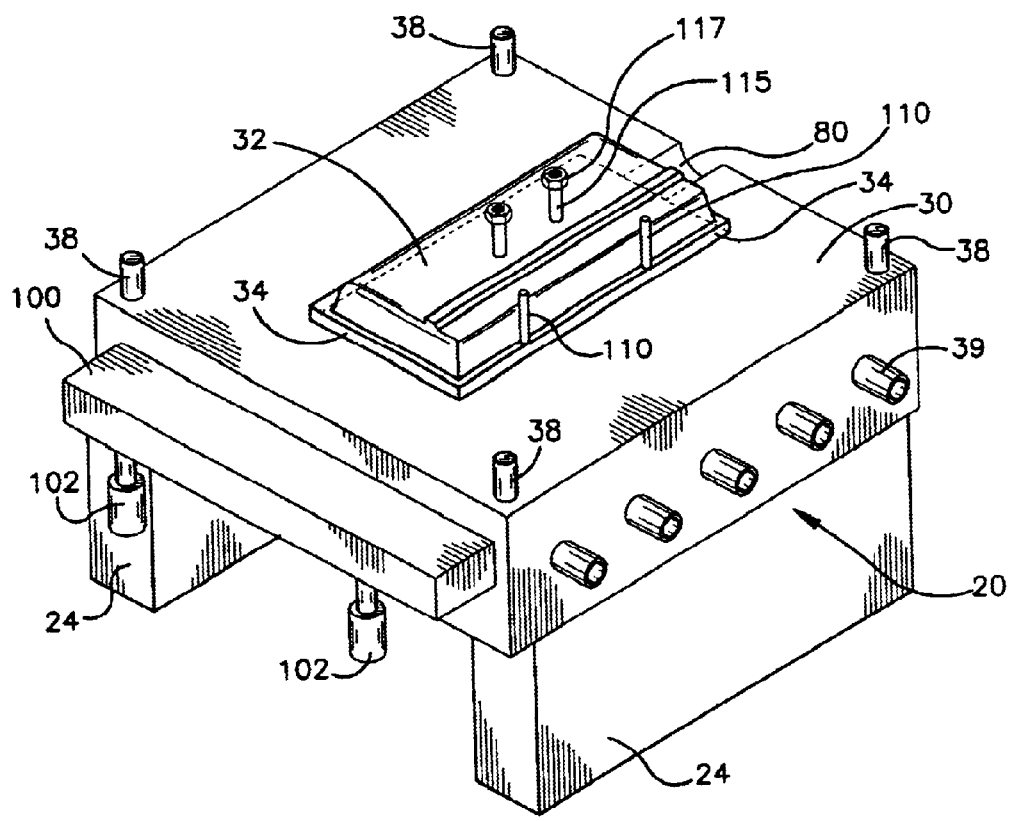
FIG. 4 is a perspective view of the pin block of the mold.

The pin block 20 of the mold 10 is shown in FIG. 4 and has multiple guide pins 38 which align the pin block 20 and bushing block 40 when they are brought together. The pin block 20 is preferably manufactured of aluminum due to considerations of weight, machinability and thermal conductivity, but any material may be used. The pin block 20 is attached to two pin block risers 24, although any number of risers may be used. The pin block risers 24 act as spacers so the mold may be installed in molding machines of varying sizes. The pin block risers 24 are rectangular solids and are placed along the exterior edges of the exterior surface of the pin block 20. The pin block risers 24 create a chamber between the pin block 20 and the platen 14 of the molding machine 12, as shown in FIG. 6, where hydraulic and pneumatic elements are placed, eliminating the need to run a large number of hydraulic hoses to and from the mold 10.

Referring again to FIGS. 4 and 6, the pin block 20 is comprised of a pin block mating surface 30, a pin block contact surface 32, a sheer surface 34, guide pins 38, and cooling tubes 39. The pin block contact surface 32 is preferably located in the central region of the pin block mating surface 30 while the remainder of the pin block mating surface 30 is flat. The pin block contact surface 32 may by convex or concave depending upon the shape of the bushing block contact surface 52 in the bushing block 40 shown in FIG. 5 and the shape of the product to be molded. Further, the pin block contact surface 32 like the bushing block contact surface 52 is contoured in a way matching the shape of the product being molded. The pin block contact surface 32 in conjunction with the bushing block contact surface 52, and the insert contact surfaces 62 of the insert assembly 60 form a mold cavity which determines the shape of the finished part as shown in FIG. 2. Referring again to FIG. 4, the sheer surface 34 is located between the contact surface 32 and the mating surface 30 of the pin block 20. The sheer surface 34 extends above and is oriented perpendicularly to the mating surface 30 of the pin block 20. A depression 80, which is preferably a machined channel, extends from near the sheer surface 34 to any edge of pin block 20. The depression 80 is a chamber for molding a second part during the mold process. In an alternate embodiment, no depression 80 is present.

As shown in FIG. 6, linear thrusters 100 are adjacent to the pin block 20 and the bushing block 40. Linear thrusters 100 are movable and are actuated by hydraulic or pneumatic cylinders 102. When the mold 10 is in operation, the linear thruster 100 adjacent to the pin block 20 will contact a linear thruster 100 adjacent to the bushing block 40 before the pin block 20 contacts the bushing block 40. Thus, the leading edge of the parison 16 will be pinched and sealed before the remainder of the parison 16 is fully compressed by the mold 10.

Figure 11:
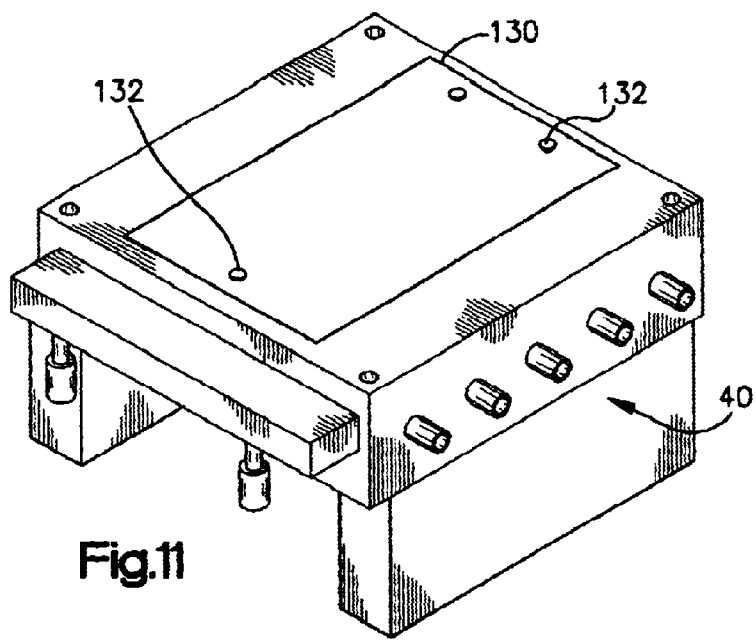
FIG. 11 is a schematic of the bushing block of the mold and a web of material to encase the finished product.

Referring again to FIG. 4, one or more blow needles 110, which are hollow, may protrude through the contact surface 32 of the pin block 20. The blow needles 110 may also be retracted beneath the pin block contact surface 32. The blow needles 110 are attached to pneumatic cylinders although any method of moving the blow needles 110 may be used. When the mold 10 is closed the blow needle 110 is extended through the pin block contact surface 32 and pierces the parison 16. Air is blown through the blow needle 110 and the parison 16 expands into the mold cavity. One or more core pins 115 may extend from the pin block contact surface 32. Mounting devices 117 such as nuts, screws, or clips are placed upon the end of the core pins 115. When the parison 16 expands into the mold cavity, the mounting devices 117 are enveloped within the parison 16. The finished part, thus, is embedded with mounting devices 117 and may easily be mounted within a larger assembly. In a similar manner, a web 130 may be wrapped around the finished part. A web 130, preferably made of vinyl, may be attached to web locator/stabilizing pins 132 as shown in FIG. 11. The web locator/stabilizing pins 132 protrude from the contact surface 52 of the bushing block 40.

Guide pins 38 are used to guide the pin block 20 and the bushing block 40 in relative motion. The guide pins 38 are preferably one or more dowels mounted upon the pin block 20 or bushing block 40. The mold block not having the dowels has bore holes 97 located to mate with the dowels, thus, aligning the mold blocks when they are brought together. The cooling tubes 39 are multiple vertical or horizontal passages through the pin block 20 as shown in FIG. 4. Fluid may be circulated directly through the cooling tubes or a sleeve of another material (not shown), preferably copper, may be placed inside the tube to protect from corrosion. Fluid is then circulated within the sleeve.

Figure 5:
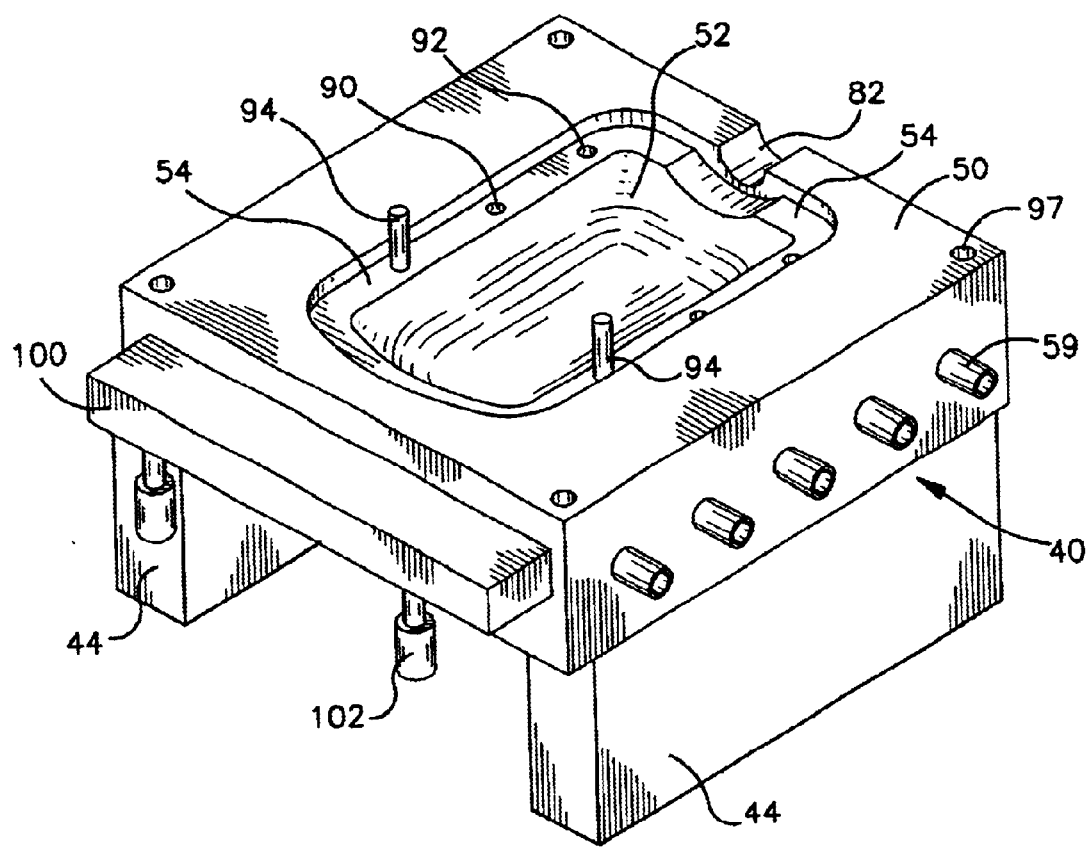
FIG. 5 is a perspective view of the bushing block of the mold.

As shown in FIG. 5, the bushing block 40 is attached to two bushing block risers 44 although any number of risers may be used. The bushing block risers 44 act as spacers so the mold 10 may be installed in molding machines of varying sizes. The bushing block risers 44 are rectangular solids and are attached along the exterior edges of the exterior surface of the bushing block 40. The bushing block risers 44 create a chamber between the bushing block 40 and the platen 14 of the molding machine 12, as shown in FIG. 6, where hydraulic and pneumatic elements are placed, eliminating the need to run a large number of hydraulic hoses to and from the mold 10.

Referring again to FIG. 5, the bushing block 40 is comprised of a bushing block mating surface 50, a bushing block contact surface 52, a seating surface 54 and cooling tubes 59. The bushing block contact surface 52 is preferably located in the central region of the bushing block mating surface 50 while the remainder of the bushing block mating surface 50 is flat. The bushing block contact surface 52 is contoured in a way matching the shape of the product being molded. The bushing block contact surface 52 is outlined by the seating surface 54. A depression 82, which is preferably a machined channel, extends from the seating surface 54 to any edge of the bushing block 40. The depression 82, with depression 80 and channel 86, form a chamber to mold a second part during the molding process. In an alternate embodiment, no depression 82 is present.

The cooling tubes 59 are multiple vertical or horizontal passages through the bushing block 40. Fluid may be circulated directly through the cooling tubes 59 or a sleeve of another material (not shown), preferably copper may be placed inside the tube to protect from corrosion. Fluid is then circulated within the sleeve.

Figure 8:
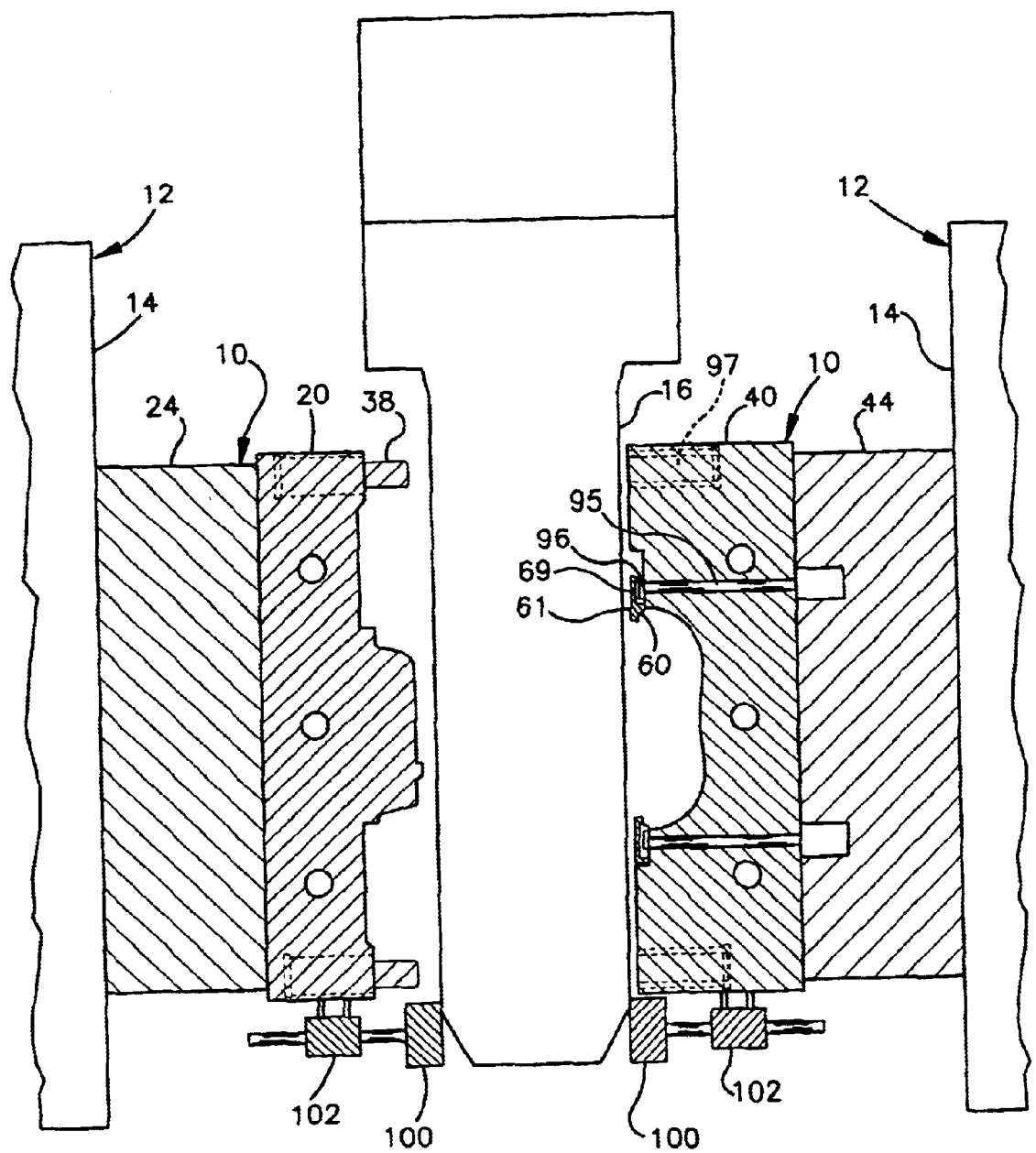
FIG. 8 is a schematic of the mold having cams to displace the insert assembly.

As shown in FIG. 1, any number of inserts 61 comprise the insert assembly 60. Preferably, the insert assembly 60 is an oblong, ring shaped solid. As shown in FIG. 2, the removable insert assembly 60 may rest upon the seating surface 54 of the bushing block 40. Each insert 61 in insert assembly 60 has an insert contact surface 62, and a sheer edge 64. The insert assembly 60 also has a bottom surface 66 and a top surface 68. The bottom surface 66 contacts the seating surface 54 of the bushing block 40 when the inserts are seated. The top surface 68 is preferably flat and flush with the mating surface 50 of the bushing block 40 when the inserts 61 are seated. Although the top surface 68 may be any width, the top surface 68 partially overhangs the bushing block contact surface 52 and the mold cavity. Thus, the insert contact surface 62 is allowed to contact and restrict a finished part. In a manner similar to the placement of depression 82 on the mating surface 50 of the bushing block 40, a channel 86 may be placed as shown in FIG. 1, across the width of the insert assembly at any position. Referring again to FIG. 2 and the phantom view within FIG. 6, the insert sheer edges 64 of the insert assembly 60 are apposed, or in close proximity, to the pin block sheer surface 34 when the mold 10 is closed. Preferably, a gap of about ½ inch exists between sheer edges 64 and the pin block sheer surface 34 when the mold 10 is closed. The insert assembly 60 includes a contact surface 62 located between the bottom surface 66 and the shear edges 64. When the insert assembly 60 is seated, the contact surface 62 holds the molded part within the bushing block 40. Only when the insert assembly 60 is removed can the molded part be removed from the bushing block 40. In one alternate embodiment of the invention as shown in FIG. 8, inserts 61 also include cam followers 69 to allow displacement of the inserts 61. The insert assembly 60 is preferably made of steel or any other magnetic material.

Figure 3:
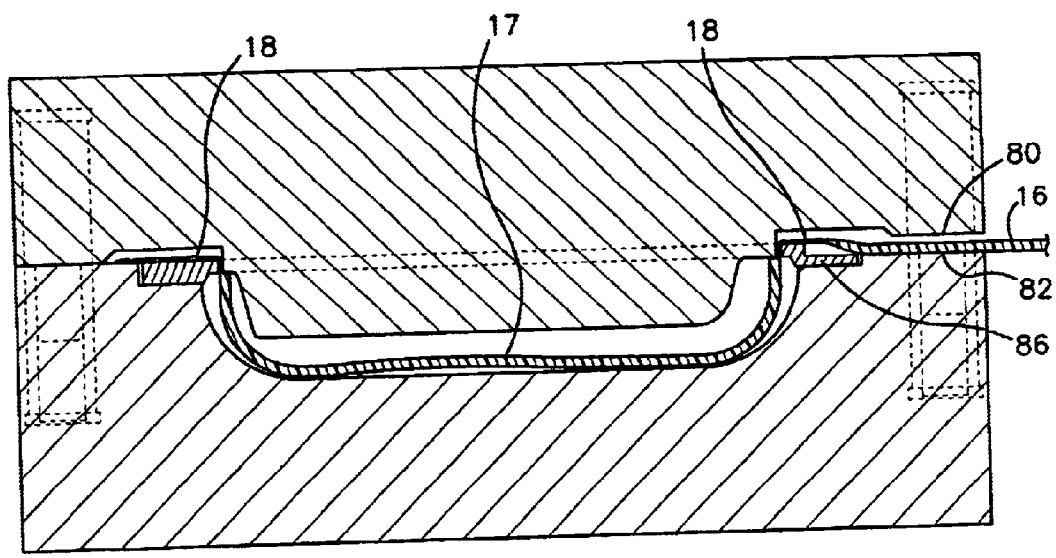
FIG. 3 is a cutaway view of the mold showing an unexpanded parison.

Referring again to FIG. 2, a gap 38 is machined within the pin block 20 to accommodate a flash portion 18 of the parison 16 which is not part of the finished part. The gap 38 may be narrow or may cover the majority of the pin block mating surface 30, as shown in FIGS. 2 and 3. Thus, the flash portion 18 does not restrict the closing of the mold block 20 and pin block 40.

Figure 7:
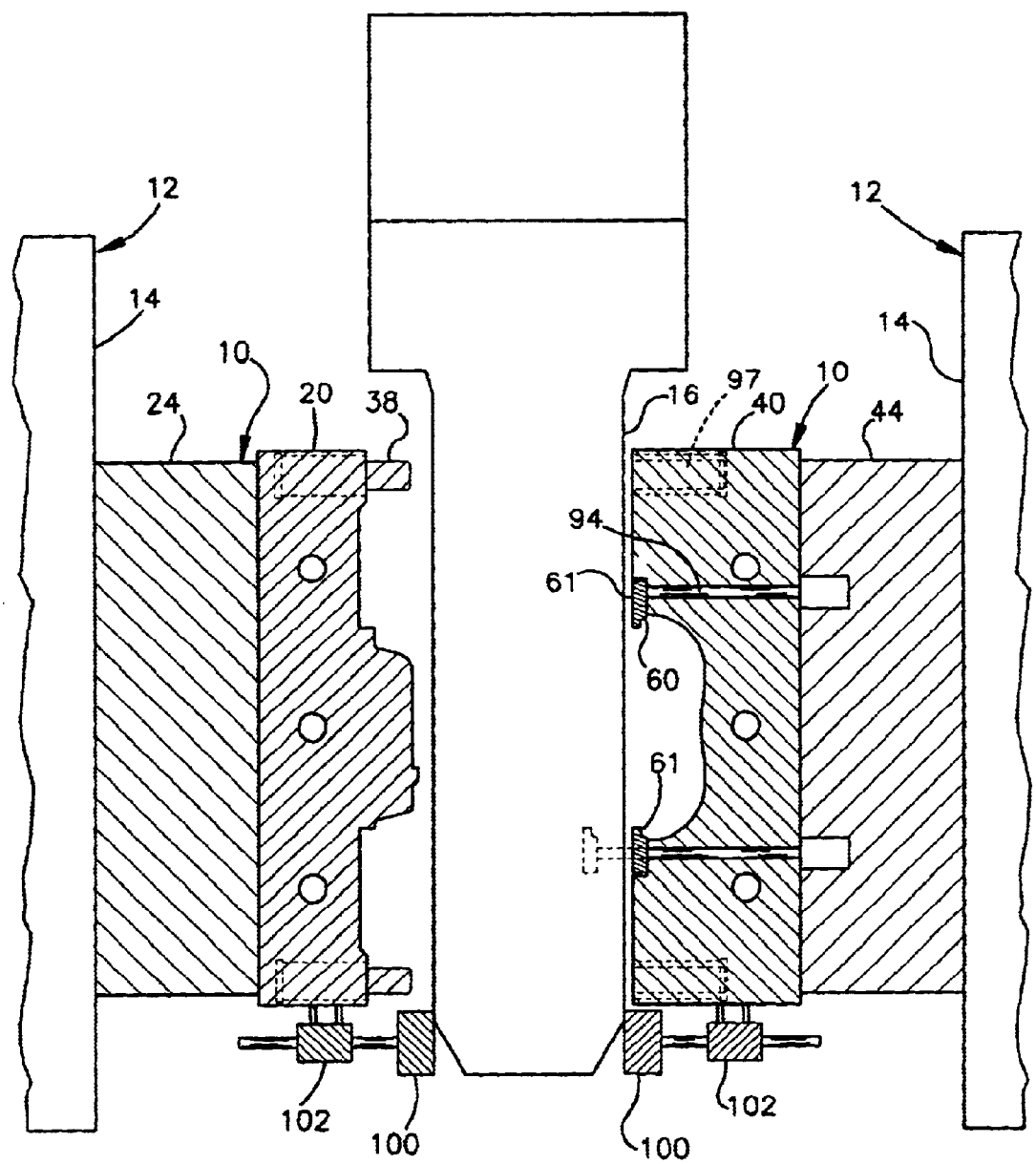
FIG. 7 is a schematic of the mold having push rods to displace the insert assembly.

As shown in FIG. 5, multiple holes 90 may be placed along the seating surface 54. Permanent magnets 92 are inlaid in the seating surface 54 by being placed into some of the holes 90. These magnets 92 hold the insert assembly 60 in place during the molding process. Other holes 90 in the seating surface 54 allow the passage of push rods 94 as shown in FIG. 7 or camshafts 95 as shown in FIG. 8 used to displace the insert assembly 60 to facilitate finished product removal. Referring to FIG. 7, push rods 94 may be activated by hydraulic or pneumatic cylinders. The insert assembly 60 is raised from the seating surface 54. An alternate embodiment is shown in FIG. 8 where a camshaft 95 and cam 96 are used to displace the insert assembly 60. A rotary cylinder may rotate the camshaft 95 and subsequently the cam 96. Cam 96 turns within cam follower 69 to slide inserts 61 along the seating surface 54. Preferably, in an embodiment utilizing cam 96 and camshaft 95, the insert assembly 60 is comprised of four or more inserts 61.

Method of Operation

The operation of the mold 10 may now be described. Referring to FIG. 6, the mold 10 is oriented in a position where the pin block 20 and the bushing block 40 are separated and the removable insert assembly 60 is in place, resting upon the seating surface 54. A parison 16, preferably created by a continuous extrusion process, is introduced into a space between the pin block 20 and the bushing block 40. The parison 16, having a leading end which extends beyond the pin block 20 and bushing block 40, is aligned parallel to the length of the mold 10. Preferably, the parison 16 has a diameter comparable to the width of the pin block contact surface 32 and bushing block contact surface 52. When the mold 10 is closed, the parison 16 is divided, although actual separation may not always occur, into a product portion 17 and two flash portions 18 which are compressed. Part, but not all, of the flash portions 18 of the parison 16 will be deformed. In an embodiment having depressions 80 and 82 and channel 86 a section of the flash portion 18 remains uncompressed. After the molding process is complete, the mold blocks reopened, and the finished part removed, a new mold process is ready to begin. As more parison material is introduced between the mold blocks, and the trailing end of the old parison becomes the leading end of the new parison.

Referring again to FIG. 6, the pin block 20 and bushing block 40 are brought towards each other. The linear thrusters 100 are activated and contact the parison 16 before the pin block 20 contacts the bushing block 40. The linear thrusters 100 pinch the leading end of the parison 16 together resulting in an airtight parison tube. The linear thrusters 100 are then retracted as the pin block 20 and the bushing block 40 are brought together. As shown in FIG. 3, when the mold 10 is closed, parts of the flashing portion 18 are compressed. Pneumatic blow pins 110 are activated, pass through the contact surface 32 of the pin block 20 and pierce the product portion 17 of parison 16. Preferably, air is blown through the blow pins 11O and into the product portion 17. The product portion 17 inflates, being restrained only by the bushing block contact surface 52, pin block contact surface 32, and the insert contact surface 62 as shown in FIG. 2. In an embodiment utilizing a web 130 of covering material, the expanding product portion 17 is surrounded by the web 130 which had been pre-placed upon the web locator/stabilizing pins 132.

Figure 9:
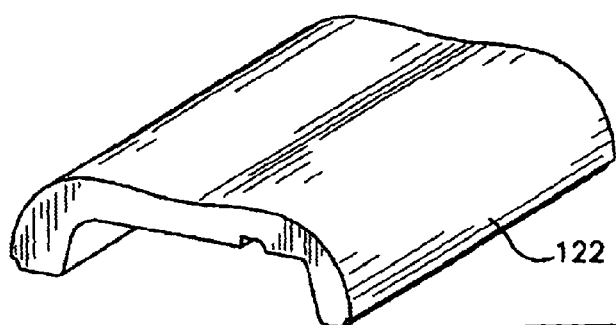
FIG. 9 is a schematic of a finished part showing a flash seam created using a mold without an insert assembly.

As the product portion 17 expands, any mounting devices 1 17 placed upon core pins 115 are enveloped by the product portion 17. A seam 120, as shown in FIG. 9 is located at the point where the product portion 17 of the parison 16 attaches or was attached to the flashing portion 18. In an embodiment having depressions 80 and 82 and channel 86, a section of flash portion 18 expands to form a second part at the same time product portion 17 expands.

Cooling fluid is circulated as needed through the cooling tubes 59 and 39 during the molding process. The injection of air is discontinued after the parison is fully expanded and has set into a permanent position. The pin block 20 and the bushing block 40 are separated.

In one embodiment the insert assembly 60 is displaced manually. In another embodiment, the insert assembly is displaced using push rods 94. Push rods 94 are actuated and lift the insert assembly 60 off of the seating surface 54 of the bushing block 40 as shown in phantom within FIG. 7. In yet another embodiment, the insert assembly 60 is displaced by a cam 96 and camshaft 95. Rotation of the cam 96 slides the insert assembly 60 along the seating surface 54 into a position where the insert assembly 60 does not overhang the mold cavity as shown in FIG. 8.

The part is then removed from the mold 10 by manual or mechanical means. The mold 10 is cleaned and prepared if necessary and the process is repeated.

Figure 10:
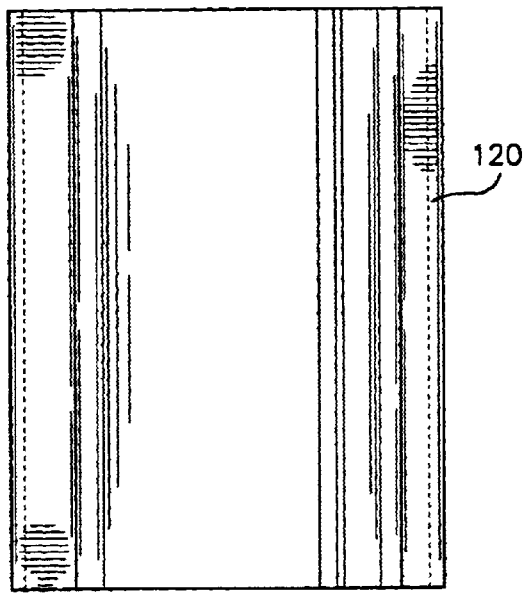
FIG. 10 is a schematic of a finished part showing a flash seam created using the mold of the present invention.

In traditional molds, the seam 122 shown in FIG. 9 must be at the location where the part has its greatest width. This may be a position which is unsightly on an ornamental part. The use of an insert assembly 60 allows the seam 120 to be moved to a less conspicuous areas on the same part as shown in FIG. 10 while still allowing the part to be easily removed from the mold 10. Ornamental parts may be produced with smooth, seamless surfaces.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A mold, for use in a blow molding process, which allows flash seams to be placed in an inconspicuous location comprising:

a first mold block having a first contact surface, a seating surface and a first mating surface;

a separable second mold block having a second contact surface, a sheer surface and a second mating surface;

removable inserts having sheer edges and insert contact surfaces;

said first contact surface, said second contact surface and said insert contact surfaces defining a mold cavity that extends into said first mold block;

said removable inserts being seated upon said first mold block and restricting removal of a molded part;

said sheer surface apposed to said sheer edges; and a cam and a camshaft for displacing said removable inserts, whereby upon displacement of said removable inserts the molded part may be removed from said mold.

2. The mold of claim 1 wherein said removable inserts form an oblong ring.

3. The mold of claim 1 wherein said first mold block, said second mold block, and one of said removable inserts have channels used to mold a stem.

4. The mold of claim 1 wherein said first mold block and said second mold block are aluminum.

5. The mold of claim 1 further having one or more blow needles prutrudable through at least one mold block half.

6. The mold of claim 1 further having one or more core pins for placing one or more mounting devices into a molded part.

7. The mold of claim 1 wherein at least one mold block further includes cooling tubes.

8. The mold of claim 1 further including web locator/stabilizing pins.

9. A mold which allows flash seams to be placed in an inconspicuous location comprising:

a first aluminum mold block having a first contact surface, a seating surface and a first mating surface;

a separable second aluminum mold block having a second contact surface, a sheer surface and a second mating surface;

removable inserts having sheer edges and insert contact surfaces;

said first contact surface, said second contact surface and said insert contact surfaces defining a mold cavity that extends into said first mold block;

said removable inserts being seated upon said first mold block and restricting removal of a molded part;

said sheer surface apposed to said sheer edges; and wherein one or more magnets are inlaid in said seating surface and said inserts are steel.

10. The mold of claim 1 wherein said removable inserts include a hollow portion into which said cam is placed.

* * * * *